United States Patent

[11] 3,624,665

| [72] | Inventor | Francis L. Klingle, Sr.<br>105 5th Ave. West, Cresco, Iowa 52136 |
|---|---|---|
| [21] | Appl. No. | 53,892 |
| [22] | Filed | July 10, 1970 |
| [45] | Patented | Nov. 30, 1971 |

[54] MINIATURE SANITARY DISPOSAL PLANT
7 Claims, 4 Drawing Figs.

[52] U.S. Cl. .................................................. 4/115, 4/10, 210/11, 210/259
[51] Int. Cl. .................................................. A47k 11/02, A61l 11/00
[50] Field of Search .................................................. 4/10, 115, 116, 8; 210/11, 259

[56] References Cited
UNITED STATES PATENTS

| 408,506 | 8/1889 | McClellan | 4/115 X |
| 691,365 | 1/1902 | Dittler | 4/115 UX |
| 1,021,663 | 3/1912 | Cronk | 4/115 X |
| 1,607,257 | 11/1926 | Gaulke | 4/115 |
| 3,423,766 | 1/1969 | Eger | 4/115 |
| 3,440,669 | 4/1969 | Boester | 4/115 X |
| 3,477,949 | 11/1969 | Liljendahl | 4/115 X |
| 3,505,690 | 4/1970 | Lockwood | 4/115 |
| 3,540,590 | 11/1970 | Schneider, Jr. | 4/115 X |

*Primary Examiner*—Henry K. Artis
*Attorney*—Berman, Davidson and Berman

ABSTRACT: A miniature sanitary disposal plant which includes a toilet combined with an enzyme digester tank, an activated carbon-leaching bed, a separating tank, a chemical-neutralizing tank, a plurality of evaporating tanks, and a discharge of purified nonpolluting fluid. A sludge trap is provided for removing sludge collecting in the system.

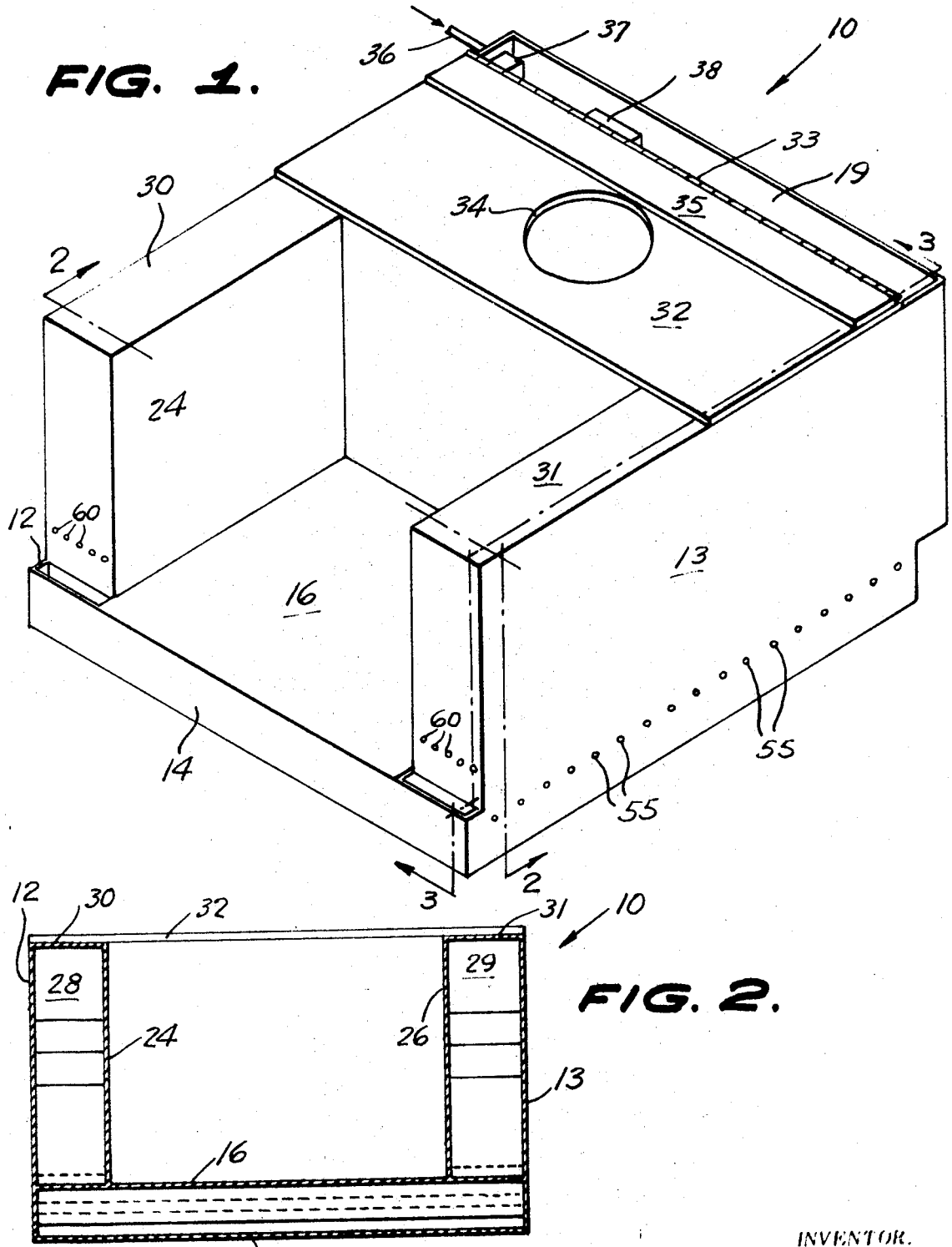

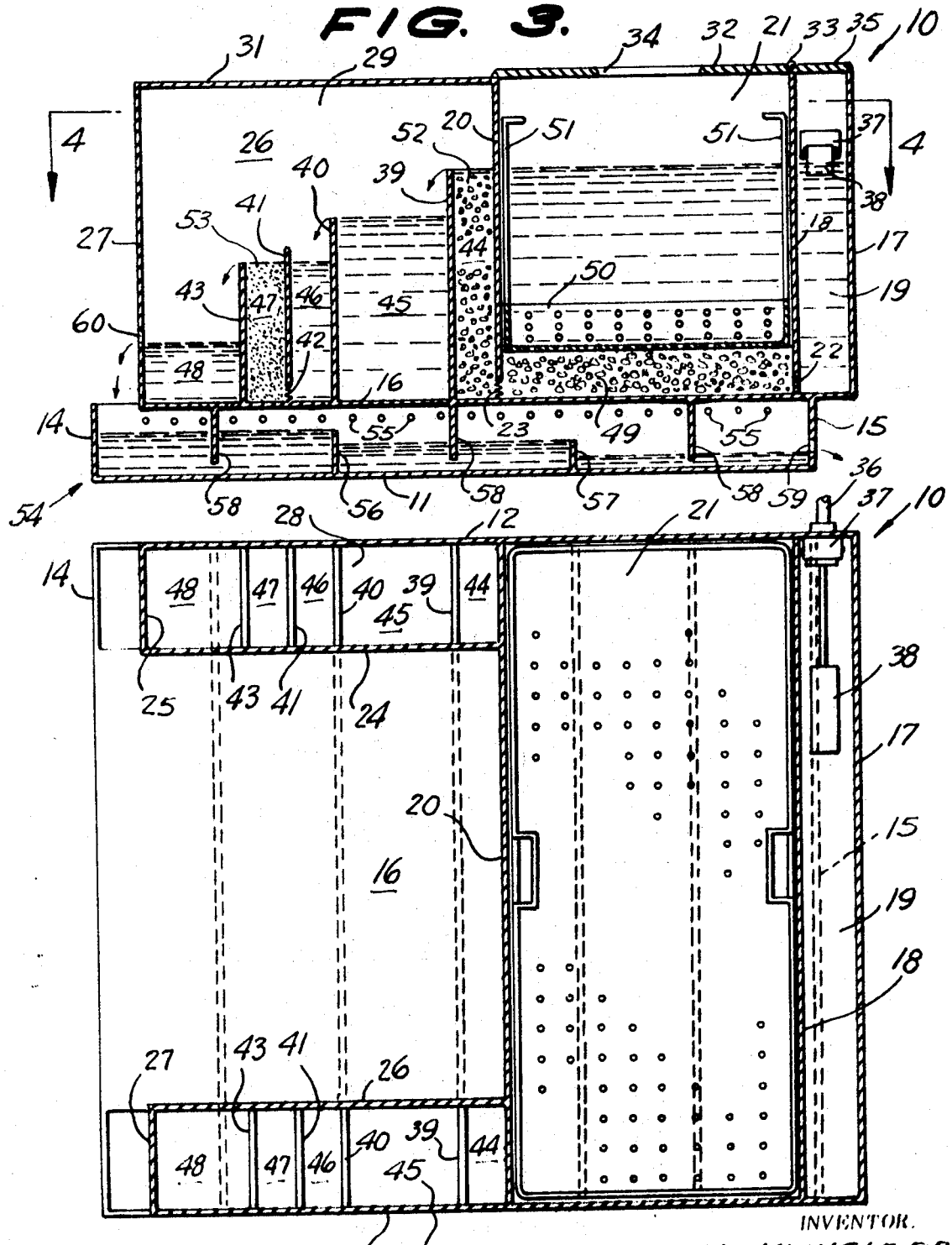

MINIATURE SANITARY DISPOSAL PLANT

BACKGROUND OF THE INVENTION

Field of the Invention

The present invention relates to a small self-contained combined toilet and sanitary disposal unit for purifying the sewage material prior to discharge.

Summary of the Invention

The primary object of the invention is to provide a toilet and self-contained sanitary disposal system in which the sewage, or other organic waste material, is digested, purified, neutralized, and at least partially evaporated prior to the discharge of the remainder as a nonpolluting fluid.

Other objects and advantages will become apparent in the following specification when considered in the light of the attached drawings.

BRIEF DESCRIPTION OF THE DRAWINGS

FIG. 1 is a perspective view of the invention;

FIG. 2 is a transverse sectional view taken along the line 2—2 of FIG. 1, looking in the direction of the arrows;

FIG. 3 is an enlarged longitudinal sectional view taken along the line 3—3 of FIG. 1, looking in the direction of the arrows; and FIG. 4 is a horizontal sectional view taken along the line 4—4 of FIG. 3, looking in the direction of the arrows.

DESCRIPTION OF THE PREFERRED EMBODIMENT

Referring now to the drawings in detail wherein like reference characters indicate like parts throughout the several figures the reference numeral 10 indicates generally a combined toilet and sanitary disposal system constructed in accordance with the invention.

The system 10 includes a generally rectangular bottom wall 11 having oppositely disposed parallel sidewalls 12, 13 extending upwardly therefrom. A relatively short end wall 14 extends up from the bottom wall 11 and connects to the sidewalls 12, 13 at its opposite ends. A second relatively short end wall 15 extends upwardly from the bottom wall 11 at the end thereof opposite the end wall 14 and is connected to the sidewalls 12, 13 at its opposite ends. An intermediate generally horizontal wall 16 extends between the sidewalls 12, 13 in parallel relation to the bottom wall 11 and spaced upwardly therefrom. The wall 16 extends to and connects with the upper edges of the wall 14 and the wall 15.

A generally rectangular upper end wall 17 is connected to one end of the wall 16 adjacent to but spaced outwardly from the end wall 15 and extends upwardly therefrom terminating at the height of the sidewalls 12, 13. A partition wall 18 extends between the sidewalls 12, 13 closely adjacent to the upper end wall 17 to form a tank compartment 19. A second partition wall 20 extends between the sidewalls 12, 13 parallel to the partition wall 18 and spaced substantially therefrom to form a second compartment tank 21. The partition wall 18 terminates at a point spaced above the wall 16 and a screen 22 extends between the bottom of the wall 18 and the wall 16. The partition wall 20 is connected to the wall 16 in the central portion thereof but is spaced therefrom at the opposite outer ends and screens 23 extend between the bottom of the partition wall 20 and the walls 16 at the outer ends of the partition wall 20. A longitudinal wall 24 is arranged in spaced apart parallel relation to the side wall 12 and extends from the partition wall 20 outwardly toward the end wall 14 terminating short of the end wall 14. An upper side end wall 25 is arranged parallel to the partition wall 20 and connects the sidewall 12 with the longitudinal wall 24.

A second longitudinal wall 26 is arranged in spaced apart parallel relation to the sidewall 13 and extends from the partition wall 20 outwardly toward the end wall 14 but terminates short of the end wall 14. An upper end wall 27 extends between and connects the end wall 13 with the longitudinal wall 26 and is arranged in aligned relation to the wall 25. The sidewall 12, partition wall 20, longitudinal wall 24 and end wall 25 form a tank compartment 28 therebetween. The sidewall 13, partition wall 20, longitudinal wall 26 and end wall 27 form a tank compartment 29 therebetween. A top wall 30 closes the compartment 28 and a top wall 31 closes the compartment 29.

A cover 32 is hingedly secured to the system 10 by a hinge 33 to close the compartment 21. The cover 32 has a hopper opening 34 formed centrally thereof to provide a toilet seat for the system 10.

A relatively narrow cover 35 is hingedly connected to the cover 32 by the hinge 33 and forms a closure for the tank compartment 19. The water supply line 36 extends to the compartment 19 and is controlled by a valve 37 actuated by a float 38 contained in the compartment 19.

The tank compartments 28, 29 are identical and each contain transverse walls 39 spaced outwardly from the partition wall 20 and parallel thereto. The walls 39 have their upper edges spaced well below the top wall 31. Walls 40 are positioned in the compartments 28, 29 parallel to and spaced forwardly of the wall 39. The walls 40 are somewhat shorter than the walls 39. Transverse walls 41 are arranged parallel to the walls 40 forwardly thereof. The walls 441 are somewhat shorter than the walls 40 and terminate above the walls 16. Screens 42 extend between the bottom of the wall 41 to the wall 16. Transverse walls 43 are arranged parallel to the walls 41 and are somewhat shorter then the walls 41. The compartments 28, 29 are divided by the walls 39, 40, 41 and 43 into compartments 44, 45, 46, 47 and 48.

A charcoal bed 49 fills the lower portion of the compartment 21 and a sludge tray 50 is positioned in the compartment 21 in contact with the charcoal bed 49. Handles 51 extend upwardly from the sludge tray 50 to provide means for removing the sludge tray 50 to empty sludge therefrom as required.

A charcoal bed 52 is formed in the compartment 44 for reasons to be assigned. A bed of calcium hypochlorite 53 is formed in the compartment 47 for reasons to be assigned.

The bottom wall 11, intermediate wall 16, sidewalls 12, 13 and end walls 14, 15 together form an evaporation tank generally indicated at 54 having a plurality of perforations formed along the upper portions thereof. An upstanding transverse retention baffle 56 extends transversely of the tank 54 and a somewhat shorter baffle 57 is arranged in spaced parallel relation thereto. A pair of depending capillary evaporation baffles 58 are arranged on opposite sides of the retention baffles 56, 57 to form increased surface contact for evaporating the water. The end wall 15 is perforated at 59 to permit the flow of fluids outwardly therefrom.

In the use and operation of the invention excrement falls into the tank 21 through the opening 34. Digestive enzymes in the water in tank 21 serve to digest the sewage materials. As the system operates fluid from the tank 21 flows downwardly through the charcoal bed 49 and upwardly through the charcoal bed 52 with the solids depositing in the sludge tray 50. The fluids then flow into the separating tanks 45, 46 and through the screen 42 upwardly through the neutralizing tank 47 where they are neutralized by the calcium hypochlorite 53 contained therein. The fluids then flow into the tank 48 and out through perforations 60 from which they flow downwardly into the evaporation tank 54. The fluids are retained by the retention baffle 56 and wet the capillary baffle 58 so that evaporation can take place through the perforations 55. As more fluid flows into the evaporation tank 54 it is retained by the baffle 57 and finally by the position of the perforations 59 above the bottom wall 11 with the additional capillary baffles 58 becoming wetted and serving to assist in the evaporation. As flow through the perforations 59 and evaporation from the evaporator tank 54 takes place additional water flows into the tank 19 through the supply line 36 under control of the valve 37 and float 38.

While the neutralizing bed 53 has been disclosed as calcium hypochlorite it should be understood that any compound producing free chlorine, such as, dichloro-iso-cyanuric acid; sodium hypochlorite and the like may be substituted therefor.

The instant system has been illustrated in its simplest form but it should be understood that recirculation of the fluids as well as aeration of the digesting fluids may be added to the system if desired for more efficient operation.

Having thus described the preferred embodiments of the invention it should be understood that numerous structural modifications and adaptations may be resorted to without departing from the spirit of the invention.

What is claimed is:

1. A combined chemical toilet and sanitary disposal system comprising a generally horizontal U-shaped tank system, a cover adapted to seat a human being secured to the central portion of said tank system and having an opening formed therein to receive organic waste material, said tank system including a sludge tray beneath the opening and compartments including means for digesting the organic waste, activated carbon means for purifying the organic waste, and an evaporator tank for evaporating the fluids flowing from said tank system.

2. A device as claimed in claim 1 wherein said digesting means includes enzyme digesting materials.

3. A device as claimed in claim 1 wherein chemical neutralizing means is contained in said tank system for neutralizing the fluids flowing from said digesting means.

4. A device as claimed in claim 1 wherein said evaporating means includes an evaporating tank formed integrally with said tank system with said evaporating tank having a plurality of capillary baffles arranged therein for increasing the surface contact of the fluids with air.

5. A device as claimed in claim 1 wherein means are provided for supplying fluid to said digestive tank to maintain the level of fluid in said digestive tank.

6. A device as claimed in claim 1 wherein said U-shaped tank system and said evaporative means provides a platform support for the feet of the user.

7. A device as claimed in claim 1 wherein said tank system includes a plurality of compartments divided by a plurality of successively shorter partition walls arranged in spaced parallel relation.

* * * * *